No. 757,112. PATENTED APR. 12, 1904.
A. L. HOLMES.
ADJUSTABLE JOINT FOR WATER AND STEAM PIPES.
APPLICATION FILED NOV. 16, 1903.
NO MODEL.

Witnesses
Cecil Cilley.
Louise Patterson

Inventor
Alba L. Holmes
Ithriel J. Cilley
Attorney.

By

No. 757,112. Patented April 12, 1904.

UNITED STATES PATENT OFFICE.

ALBA L. HOLMES, OF GRAND RAPIDS, MICHIGAN.

ADJUSTABLE JOINT FOR WATER AND STEAM PIPES.

SPECIFICATION forming part of Letters Patent No. 757,112, dated April 12, 1904.

Application filed November 16, 1903. Serial No. 181,452. (No model.)

*To all whom it may concern:*

Be it known that I, ALBA L. HOLMES, a citizen of the United States, residing at Grand Rapids, in the county of Kent and State of Michigan, have invented certain new and useful Improvements in Adjustable Joints for Water and Steam Pipes, of which the following is a specification.

My invention relates to improvements in adjustable joints in water-pipes, more particularly known as the "ball-and-socket" joint; and its objects are, first, to insure a full free flow of water through the joint and, second, to provide a joint having a full free flow of water that may be adjusted to any desired angle without danger of leakage between the ball and the bell. I attain these objects by the mechanism illustrated in the accompanying drawings, in which—

Figure 1:
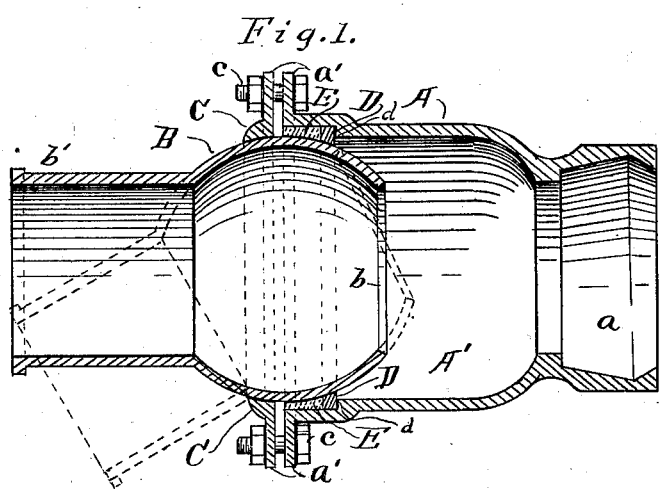
Figure 2:
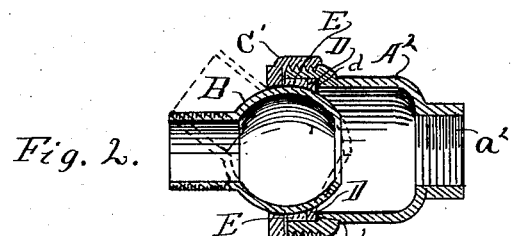
Figure 3:
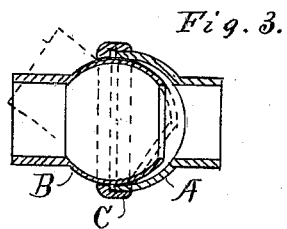
Figure 4:
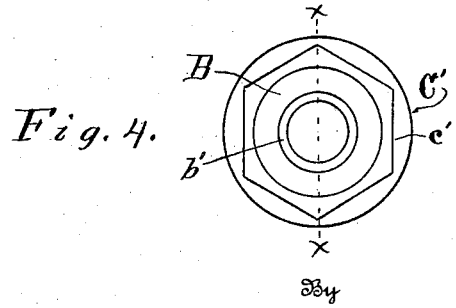

Figure 1 is a sectional elevation of a large joint on the line $xx$ of Fig. 4. Fig. 2 is a like view of a small joint. Fig. 3 is the same, showing the ordinary ball-and-socket adjustment as now in use; and Fig. 4 is an end elevation of an adjustable joint.

Similar letters refer to similar parts throughout the several views.

It will be noted that in adjustable joints such as are in common use, as indicated in Fig. 3, the chamber back of the opening $b$ in the ball B is so small that when the ball B is thrown around to the position indicated by the dotted lines the body of the ball will form a practically solid wall or dam in the water-channel that cuts off the flow of water very materially, and my object is to obviate the effect of this dam and insure a full free flow of water through the joint with an open area nearly or quite equal to the inner diameter of the main pipe. I attain this object by elongating the bell A to form a long open water-chamber A' of sufficient capacity so that when the ball B is thrown around at an angle with the line of pipe, as indicated by the dotted lines in Figs. 1 and 2, the full capacity of the opening $b$ in the ball will be open for the free flow of the water therethrough practically without obstruction.

To render this valve operative and avert the danger of leakage of water or steam between the bearings of the ball B and the bell A, it is necessary to provide a safe reliable gasket or packing, and for this purpose I form a shoulder $d$ in the bell A and fit a wooden or other suitable gasket D into the chamber adjoining the shoulders $d$ to act the double purpose, first, of an auxiliary gasket and, second, to act as a dam to prevent the gasket E, of lead or other material I may determine to use, from passing through into the chamber A'. My object in using this form of gasket is twofold—first, to avert the labor and expense of forming a turned and ground joint at this point between the bell and the ball, which would entail a great amount of additional expense in preparing the bearing in the bell, and, second, to avert the possibility of the heavy pressure forcing the water through any imperfect point in the bearing and cutting away the metal, ultimately causing a serious leak in this joint.

The bell A should project over to about the center of the ball B, and in large joints I provide a flange $a'$, which is secured by means of bolts $c$ to the collar C, which is so fitted upon the ball B that when bolted to the flange $a'$ upon the bell A it forces the ball B solidly against the gaskets D E, insuring a perfect water-tight joint between the bell and the ball no matter what the position of the ball may be. It is of course necessary to turn the ball up to a perfect globular form over the entire bearing-surface, so that the imperfection of surface between this and the gaskets will be reduced to the minimum.

In the large joint shown in Fig. 1, $a$ represents an inner coupling, and $b'$ represents an outer coupling, designed to connect with ordinary form of couplings or packing-joints in a line of large piping.

With the small joints illustrated in Fig. 2 I use an exactly similar bell $A^2$, ball B, and gaskets D and E; but the coupling may be more easily and conveniently made by the use of a collar C', that may be screwed upon the end of the bell $A^2$, as indicated in Fig. 2, in which $c'$ is a bearing for a wrench and $a^2$ represents a screw-thread for coupling the joint upon gaspipe, steam-pipe, or small water-pipe.

Having thus fully described my invention, what I claim as new, and desire to secure by Letters Patent of the United States, is—

In an adjustable pipe-coupling, a short annular body having an enlarged ball at one end, a bell having a shoulder at the end adjacent to the ball, the walls extending in a direct line back some distance from said shoulder and then curving to the normal size of the body of the ball, a wooden dam and metal gasket in the end of the bell around the ball, a clamping-ring bearing upon the surface of the ball opposite the bell, and firmly connected with the bell, substantially as and for the purpose set forth.

Signed at Grand Rapids, Michigan, October 31, 1903.

ALBA L. HOLMES.

In presence of—
CECIL C. CILLEY,
ITHIEL J. CILLEY.